(12) United States Patent
Tischler et al.

(10) Patent No.: US 6,595,229 B2
(45) Date of Patent: Jul. 22, 2003

(54) MOTOR OPERATED CONTROL VALVE

(76) Inventors: Edward Joseph Tischler, 2023 Duluth St., Maplewood, MN (US) 55109; Brian Joseph Tischler, 4661 Aspen Ridge Cir., Eagan, MN (US) 55122

( * ) Notice: Subject to any disclaimer, the term of this patent is extended or adjusted under 35 U.S.C. 154(b) by 0 days.

(21) Appl. No.: 10/011,558

(22) Filed: Nov. 6, 2001

(65) Prior Publication Data

US 2003/0084943 A1 May 8, 2003

(51) Int. Cl.[7] ............................ F17D 3/00; F16K 11/085
(52) U.S. Cl. ................. 137/1; 137/624.11; 137/625.47
(58) Field of Search ................. 137/625.47, 624.11, 137/625.29, 1

(56) References Cited

U.S. PATENT DOCUMENTS

| | | | | |
|---|---|---|---|---|
| 4,136,032 A | * | 1/1979 | Bakken et al. | 137/625.29 X |
| 5,162,080 A | * | 11/1992 | Drager et al. | 137/625.29 X |
| 5,244,013 A | * | 9/1993 | Gagas | 137/625.29 |
| 5,816,290 A | | 10/1998 | Altshuler | |

* cited by examiner

Primary Examiner—Kevin Lee

(57) ABSTRACT

A valve consisting of a motor that rotates a cylinder to perform various functions in controlling liquid flow. The operation being controlled by a cam operated switch to start and stop cylinder in the various cycles.

13 Claims, 5 Drawing Sheets

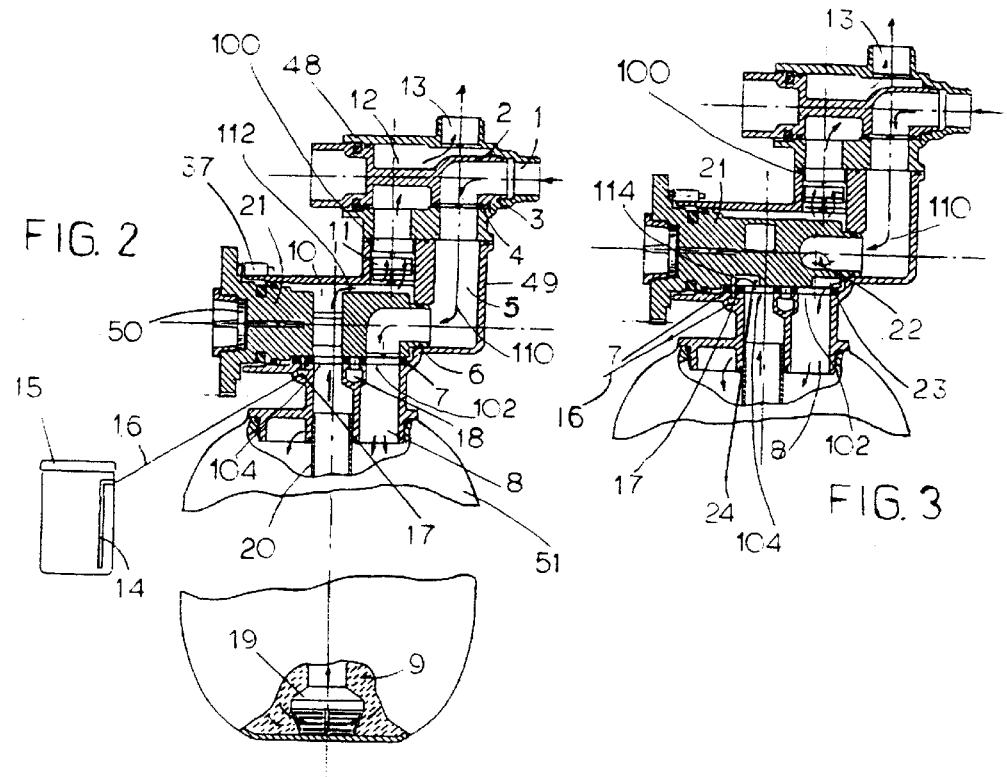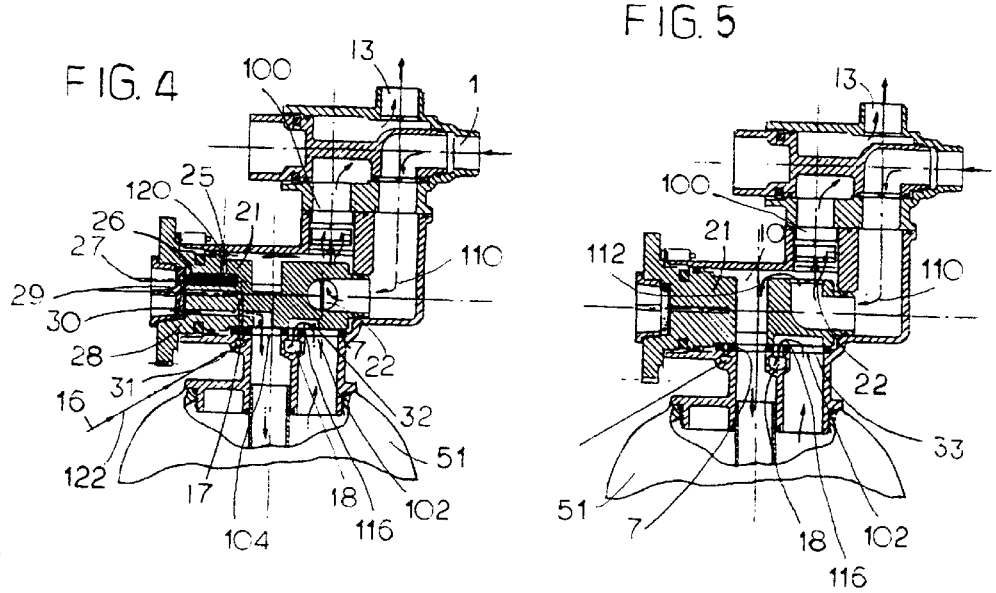

MOTOR OPERATED CONTROL VALVE

CROSS-REFERENCE TO RELATED APPLICATIONS

Not applicable.

BACKGROUND—FIELD OF INVENTION

This invention relates to a rotary cylinder valve that may be used in a water softening capacity that controls the liquid flow though the softener resin in five cycles by regenerating the ion exchange resin with brine as a regenerate.

BACKGROUND—DESCRIPTION OF PRIOR ART

Prior valve design usually consists of a rotating disc or reciprocating piston that require a large number of parts, with an excessive amount of sealing surfaces and are relatively expensive to manufacture. Other factors to consider in prior valves are as follows:

(a) more prone to liquid leaks due to excessive sealing surfaces;
(b) high operating torque needed to rotate or reciprocate functional member;
(c) the complicated means for homing in service cycle by use of an additional switch, optical lens, or continuous monitoring by the control circuit;
(d) complex designs making it unfeasible to mold more than one control valve at a time making parts more costly;
(e) prior valves may need special fixtures, heat welding machines and a large area for production;
(f) prior valves are complicated and difficult to service;
(g) present designs are not adaptable in altering configuration of mold to change outside appearance for vendor purposes;
(h) prior valves do not have a positive means to alleviate the accumulation of air or liquid before removing main valve components;
(i) present bypass valves are of the push pull or turn spool type U.S. Pat. Nos. 5,931,196 or 5,152,321 that contain an excessive amount of sealing surface making sealing member difficult to actuate, and uneconomical to be motor driven;
(j) prior valves contain an excessive number of parts in comparison to its functional requirements;
(k) prior valve designs do not have the capability of illustrating functional capabilities in simple form;
(l) prior valves designs do not lend themselves to be enlarged into commercial sizes due to difficulties in torque requirements and assembly.
(m) prior valve designs as in U.S. Pat. No. 5,816,290 require a central fluid flow path with many complicated chambers that are difficult for mold design.

SUMMARY

It is the object of this invention to provide an improved rotary control valve.

Objects and Advantages

Several objects and advantages of the present invention are:

(a) to provide a valve of various sizes capable of using the same basic design while eliminating the variable effects of friction due to pressure and area differences that is associated with increased valve size;
(b) another object is to design a unique rotary cylinder having liquid passages in one unit that aligns with seal openings to perform various cycle functions where cylinder opening or cavities may be repositioned to change flow patterns if desired;
(c) an object is to simplify the orientation of the cylinder in relation to its service position and have it readily visible as to its cycle location;
(d) another object of the invention is having the capability of containing functional parts such as an aspirator in the main cylinder to simplify replacement of all internal functional parts;
(e) another object is to produce a valve constructed in one plane to simplify molding with the capability of producing more than one valve at a time to reduce cost. This also makes drawing diagrams easily understood by the average service person for repairing purposes;
(f) another object is to produce a valve where main seal is accessible by the simple removal of a 'U' pin, which also acts as a liquid or air pressure relief;
(g) another object of the invention is to produce a bypass valve containing a minimum amount of parts and sealing surface allowing it to be economically feasible in using a handle or motor to rotate valve shaft;
(h) another object is to have a cam-operated switch capable of producing a short electrical impulse prior to service position that interacts with timer electronics to indicate service is the next position;
(i) another object is to have control valve achieve its functions using the minimal amount of sealing surfaces, which affects rotating torque, and making it less prone to failure due to liquid leaks;
(j) another object is to have all functional parts easily accessible for manufacturing and repairs;
(k) another object is having the option of positioning the timer according to requirements as in a one or two tank unit.

DRAWING FIGURES

FIG. 2 shows a cutaway view of the liquid treatment apparatus showing the valve in the service position with connection to the salt container where brine is produced FIG. 3 is a cutaway view of valve in the fill position, which allows the flow of soft water liquid to salt container for brine make-up. Water is also available to service lines as hard water.

FIG. 4 is a cutaway view showing the valve in the regeneration cycle where brine is injected into the system by means of an aspirator to rejuvenate the system.

FIG. 5 is a cutaway view showing the valve in the backwash cycle that allows the resin to rise and clean the resin beads while dislodging foreign matter out the drain.

DESCRIPTION OF FIGURES—PREFERRED EMBODIMENT

Figure 1:
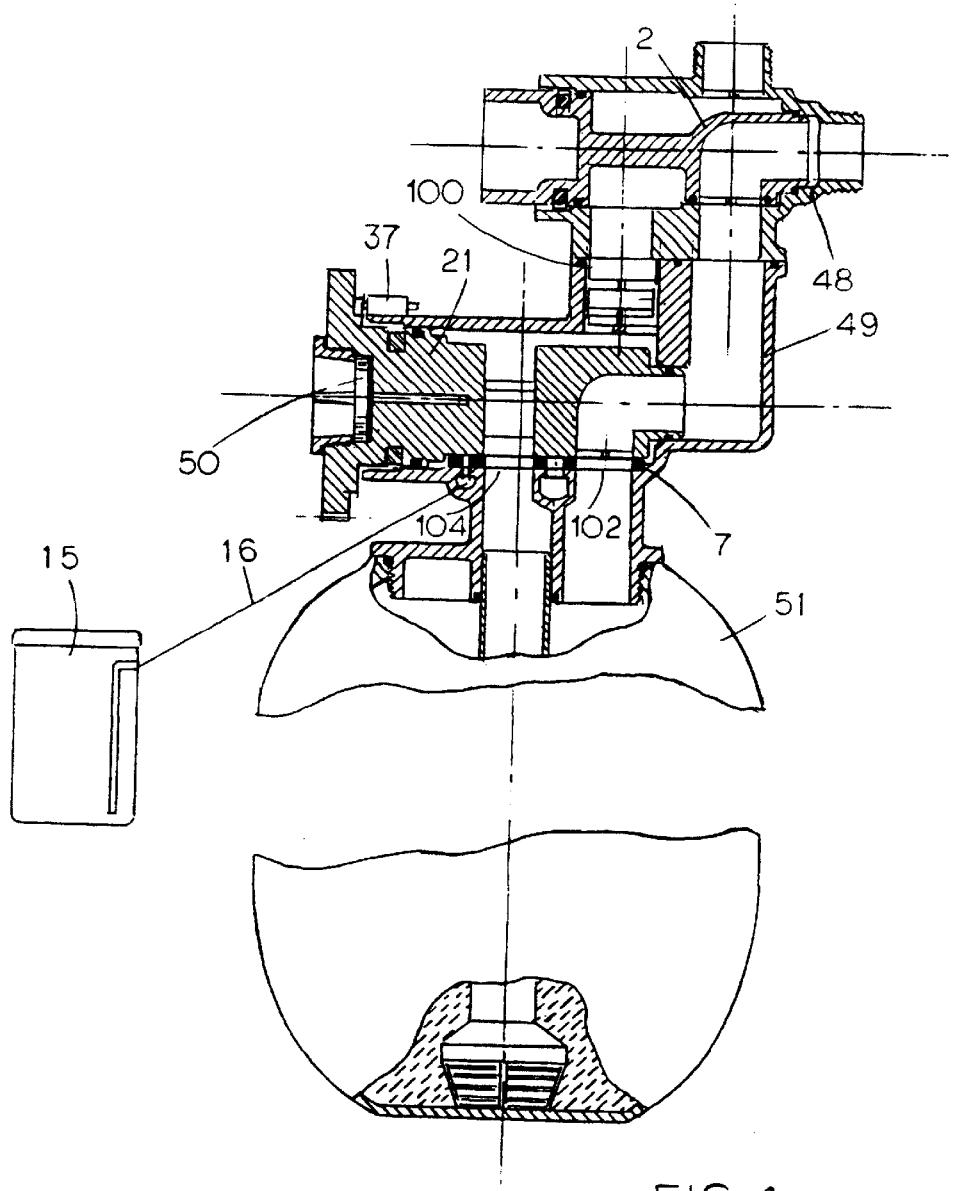
FIG. 1 is a partial broken away view of complete liquid treatment apparatus in service position.

FIG. 1 is a cutaway drawing showing valve 48 and 49 in relation to tank 51 and salt containing receptacle 15. The drawing FIG. 2 shows the control valve 49 in the service position with the liquid entering the bypass 48 through opening 1 and flowing through opening in rotor member 2 containing seals 3 and 4 and allowing liquid to flow though opening 5 in valve 49 and continuing through opening in front of cylinder 21 containing seal 6 and through opening in sealing member 7 and opening 8 down through resin bed 9 which softens water and enters bottom distributor 19 and flowing up tube 20 past seal 7 and opening in cylinder 21 into chamber 10 and past turbine 11 around passage 12 to outlet 13 in bypass 48 to service line. Also shown in FIG. 2 are openings 17 connecting line 16 to tube 14 in container 15 and opening 18 for drain.

The refill cycle FIG. 3 is shown with the cylinder 21 revolved so opening 22 provides hard water to service line 13 while allowing liquid to enter through recess 23 in cylinder 21 and flow through chamber 8 and down ion exchange resin 9 and continue through openings in bottom distributor 19 as soft water. The soft water flows up tube 20 and opening in seal 7 and out recess 24 in cylinder 21 and out connector 17 through brine line 16 and tube 14 into container 15. The volume of liquid flowing to container 15 may be controlled by timing refill rate or by a float controlled shut off valve.

FIG. 4 shows the regeneration and slow rinse cycle where the cylinder 21 is positioned to allow liquid from bypass 1 to flow through opening 22 in cylinder 21 to supply hard water to service line 13. Bypass liquid is also diverted around cylinder 21 and through hole 25 in cylinder 21 and screen 26 through hole 27 and gasket 28. Liquid then flows through nozzle 29 creating a suction that draws regenerant solution from tube 14 into opening 17 entering recess 30 and combining with nozzle liquid and then enters chamber 31 in cylinder 21 and continuing down and upward through ion exchange mineral 9 that restores the hardness removal ability and the regenerant flow continues though opening in seal 7 through recess 32 in cylinder 21 and out drain 18.

FIG. 5 is shown in the backwash position after cylinder 21 revolves and stops at the predetermined time and allows hard water to be bypassed to service line 13 through opening 22 in cylinder 21 while some liquid is diverted through cylinder opening 10 past gasket opening of seal 7 and down riser tube 20 and up ion exchange mineral 9 though recess 33 in cylinder 21 and out drain passage 18. This cycle cleans the mineral beads and dislodges foreign matter.

Figure 6:
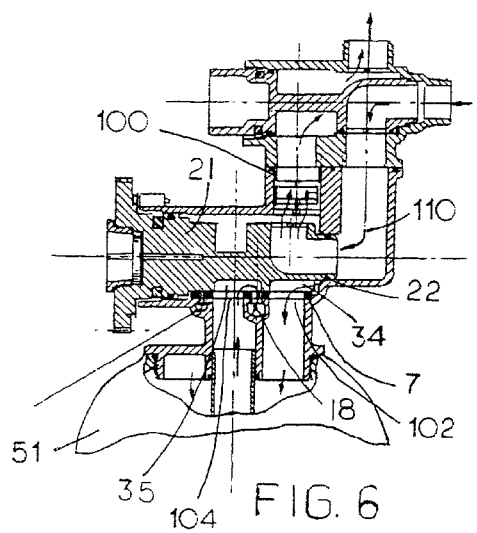
FIG. 6 is a cutaway view showing the valve in the fast rinse position where the resin bed is packed and insures soft water to outlet when valve returns to service.

FIG. 6 shows unit in a fast rinse position that allows some liquid to enter through recess 34 in cylinder 21 through opening in seal 7 and flowing downward through ion exchange resin 9 and bottom distributor 19 and up tube 20 past opening in seal 7 and though recess 35 in cylinder 21 out drain opening 18. This cycle packs the ion exchange bed and assures immediate soft water when positioned to service position.

Figure 7:
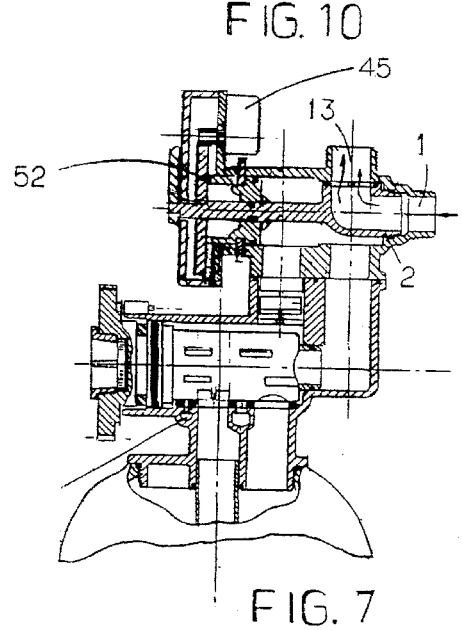
FIG. 7 shows main valve in the service position with the bypass valve rotated my means of a motor to the bypass position allowing hard water to service line, but shutting off liquid flow to valve.

FIG. 7 shows a motor 48 activated bypass that rotates gear 49 allowing liquid to be diverted from main liquid supply 1 to the house line 13 as hard water.

Figure 8:
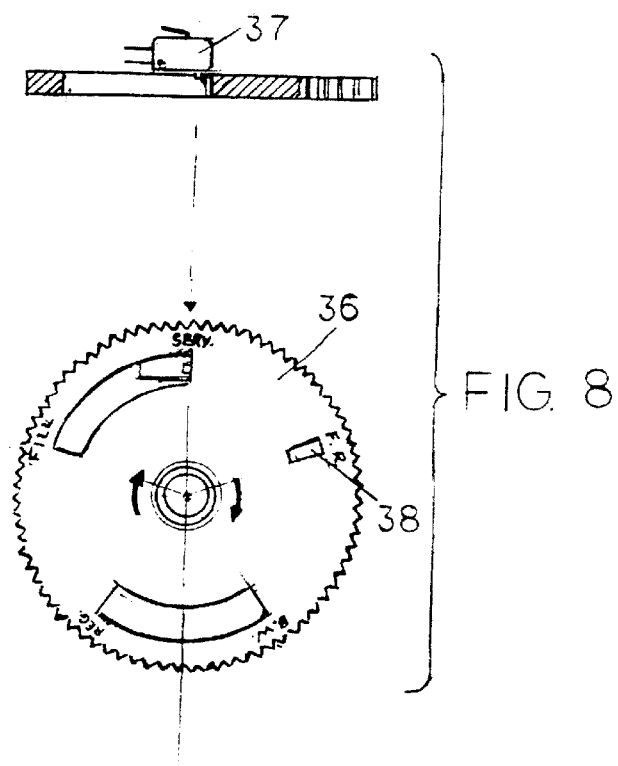
FIG. 8 shows switch in service position and the sequence of cycle position on gear and its homing capability.

FIG. 8 shows configuration in cam 36 in relation with switch 37 that controls the various functions to be performed. Also shown is confined opening 38 in cam 36 to assist in homing to service position.

Figure 9:
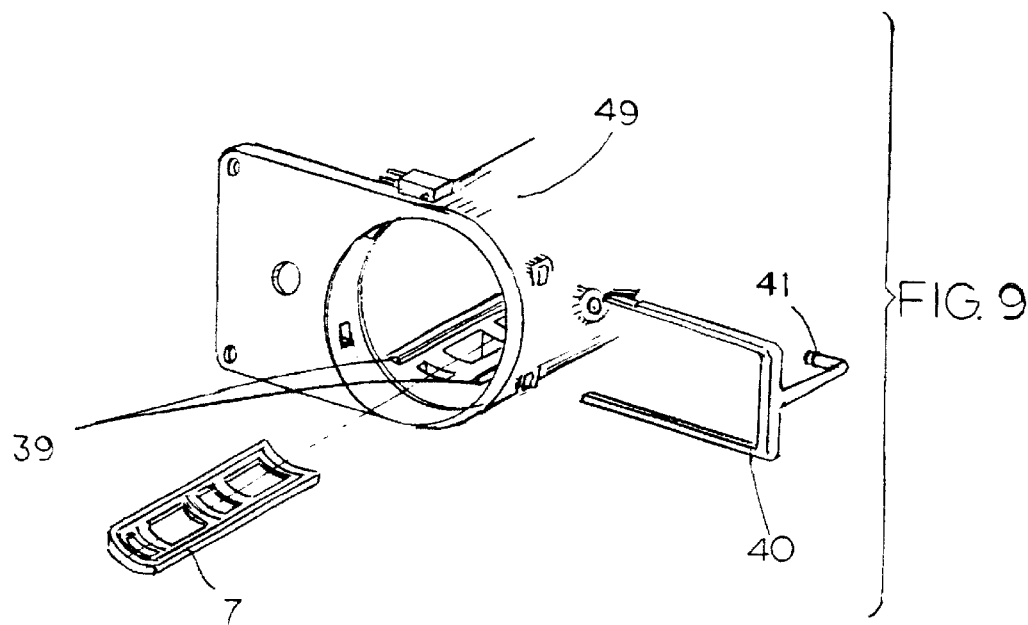
FIG. 9 shows a means of inserting seal and operation of pressure release on U-pin.

FIG. 9 shows seal 7 positioned to be inserted in valve body 49 and contained between two protrusions 39 allowing openings in seal 7 to align with valve 49 openings to control liquid flow. Also shown is U-pin 40 that retains cylinder 21 and contains o-ring 41 that acts as a pressure relief before U-pin can be dislodged.

Figure 10:
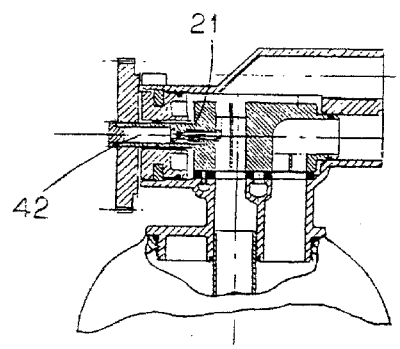
FIG. 10 shows another means of integrating aspirator into main cylinder.

FIG. 10 shows a different type of aspirator 42 contained in cylinder 21 and another means to position inlet and outlet openings.

Figure 11:
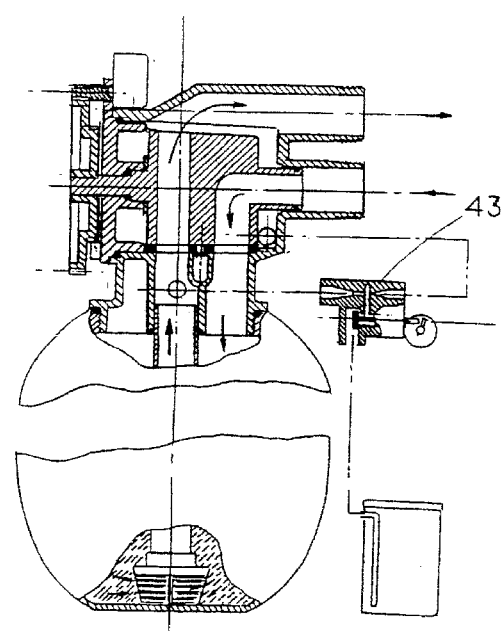
FIG. 11 shows valve design to reduce friction especially in large valves by having aspirator mounted outside valve.

FIG. 11 shows means to reduce friction on large rotating cylinders by separating aspirator 43 from valve body by eliminating seal area to refill port and reducing size of o-ring seal on cylinder shaft.

Figure 12:
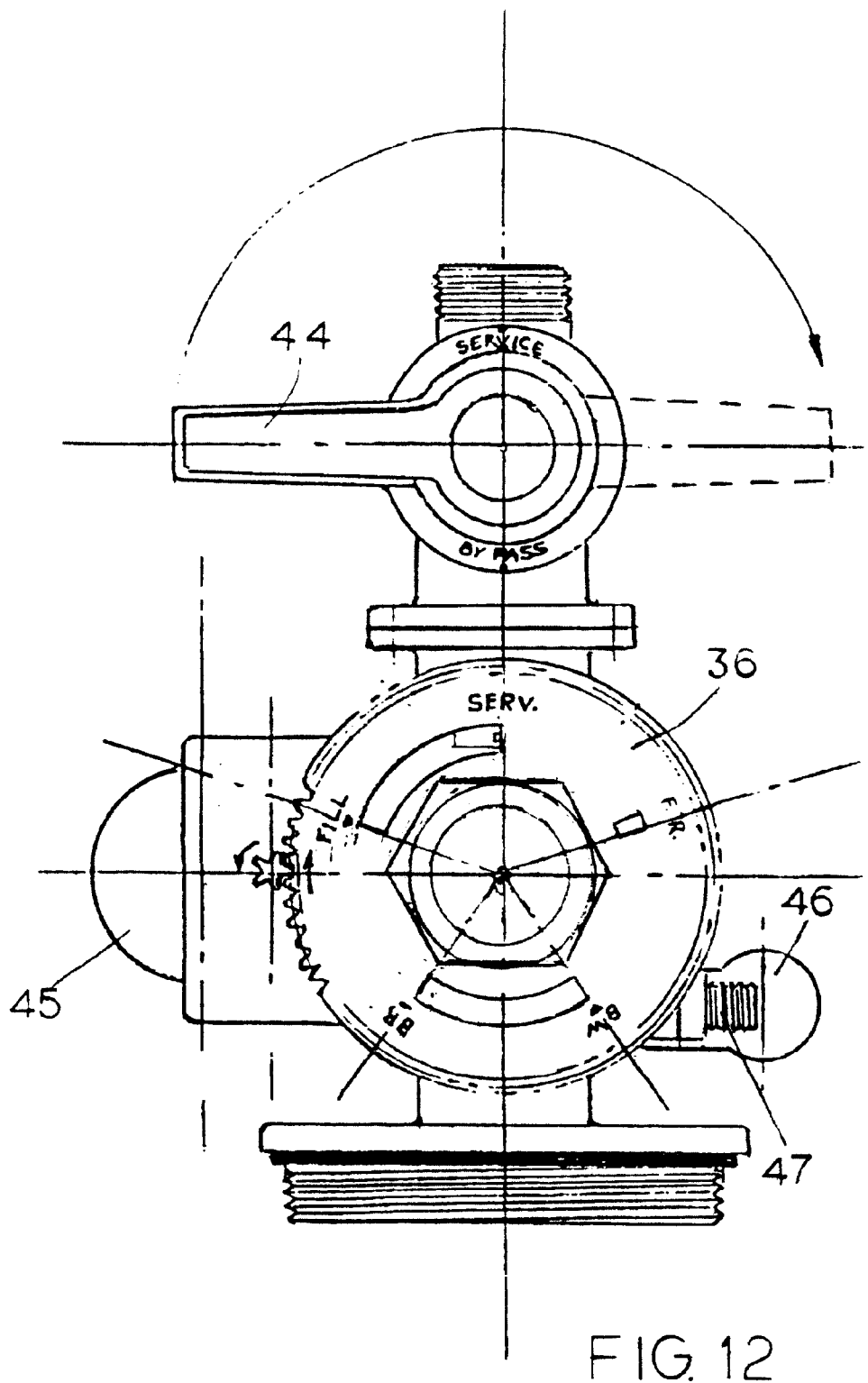
FIG. 12 shows position of motor in relation to gear and cam that allows the cylinder to be removed without interfering with switch or motor, and connections to float and drain connections.

FIG. 12 shows back of valve and position of a motor 45, drain 46, fitting 47 connection to container, gear 36 containing cam and handle 44, position of bypass valve.

The rotatable cylinder 21 is positionable at five angular orientations in the valve housing 49: (1) service position (FIG. 2), (2) refill position (FIG. 3), (3) regeneration and slow rinse position (FIG. 4), backwash position (FIG. 5), and fast rinse position (FIG. 6).

The valve housing 49 has a substantially cylindrical cavity 10 formed therein with a liquid inlet port 22, a liquid outlet port 100, a regenerant refill port 17, a drain port 18, a first tank port 102 and a second tank port 104.

The cylinder 21 generally includes a first primary flow path 110 and a second primary flow path 112, a first secondary flow path 114 and a second secondary flow path 116 as illustrated in the figures.

When in the service position (FIG. 2), the first primary flow path 110 directs untreated fluid from the liquid inlet port 22 to the first tank port 102, as illustrated in FIG. 2. While the rotatable cylinder 21 is in the service position, the second primary flow path 112 directs treated fluid from the second tank port 104 to the liquid outlet port 100. As the untreated fluid moves from the first tank port 102 to the second tank port 104, it passes through resin tank 51, which converts the untreated fluid to a treated fluid.

When in the refill position (FIG. 3), the first primary flow path 110 directs untreated water from the liquid inlet port 22 simultaneously to the first tank port 102 and the liquid outlet port 100. The first secondary flow path 114 directs liquid from the second tank port 104 to the regenerant refill port 17 where the liquid passes through line 16 to tank 15.

When in the regeneration and slow rinse position (FIG. 4), the first primary flow path 110 directs untreated liquid from the liquid inlet port 22 simultaneously to the liquid outlet port 100 and to nozzle 120. As the untreated liquid passes through the nozzle 120, suction is created, which draws regenerant solution along a regenerant flow path 122 from regenerant tank 15 to the regenerant refill port 17 via regenerant solution line 16. The regenerant flow path 122 directs regenerant solution to the second tank port 104. As the regenerant solution flows from the second tank port 104 to the first tank port 102, the regenerant solution recharges the resin tank 51. From the first tank port 102, the regenerant solution is directed to the drain port 18 via a second secondary flow path 116.

When in the backwash position (FIG. 5), the first primary flow path 110 directs untreated liquid from the liquid inlet port 22 simultaneously to the liquid outlet port 100 and the second primary flow path 112. The second primary flow path 112 directs untreated liquid to the second tank port 104. As the untreated liquid moves from the second tank port 104 to the first tank port 102, the untreated water passes through resin tank 51, which cleans the resin tank 51. The untreated liquid passes through the first tank port 102 and is directed to the drain port 16 via a second secondary flow path 116.

When in the fast rinse position (FIG. 6), the first primary flow path 110 directs untreated liquid from the liquid inlet port 22 simultaneously to the liquid outlet port 100 and to the first tank port 102. As the untreated liquid moves from the first tank port 102 to the second tank port 104, the untreated liquid flows through the resin tank 51 to pack the ion exchange material and assure immediate soft water when switched to the service position.

We claim:

1. A control valve assembly for a water treatment system, the control valve comprising:
    a housing having a substantially cylindrical cavity formed therein with a liquid inlet port, a liquid outlet port, a regenerant refill port, a drain port, a first tank port and a second tank port; and
    a rotor having a central axis, wherein the rotor is rotatable about the central axis when the rotor is mounted in the cavity, wherein the rotor consists essentially of:
        a first primary flow path that selectively directs liquid from the liquid inlet port to the liquid outlet port and the first tank port;
        a second primary flow path that selectively directs liquid between the first primary flow path, the second tank port, and the liquid outlet port;
        a first secondary flow path that operably connects the regenerant refill port and the second tank port; and
        a second secondary flow path that operably connects the first tank port and the drain port.

2. The control valve assembly of claim 1, wherein the regenerant refill port is in communication with a regenerant tank, wherein the drain port is in communication with a drain line, and wherein the first and second tank port are in communication with a resin tank.

3. The control valve assembly of claim 1, further comprising a motor, a shaft, a rotating gear, a cam as part of the rotating gear, and a switch, wherein the motor, the rotating gear and the cam are mounted on the shaft, wherein the motor-driven rotating gear controls the cam whereby the switch is activated to position the rotating cylinder.

4. The control valve assembly of claim 3, wherein the switch provides an electrical impulse that controls positioning of the rotating cylinder.

5. The control valve assembly of claim 1, and further comprising a timer controlled to activate the motor to rotate the rotating cylinder to selectively align the rotating cylinder slots with or block openings in said rotary control valve.

6. The control valve assembly of claim 5, wherein the cam-operated switch produces a short electrical impulse prior to service position that interacts with the timer to indicate service is the next position.

7. The control valve assembly of claim 1, and further comprising a seal that extends between the housing and the rotor proximate the regenerant refill port, the drain port, the first tank port and the second tank port.

8. The control valve assembly of claim 1, wherein the rotor houses an aspirator.

9. The control valve assembly of claim 1, wherein the housing contains a pair of apertures formed therein to accommodate insertion of a U-pin, wherein the U-pin maintains the rotor in the housing.

10. The control valve assembly of claim 9, wherein the U-pin comprises a cylinder projection containing an O-ring seal, said O-ring seal relieving pressure in the housing before the U-pin can be disengaged.

11. The control valve assembly of claim 1, wherein the rotor has a first end and a second end and wherein a first seal is provided on the rotor proximate the first end and a second seal is provided on the rotor proximate the second end.

12. The control valve assembly of claim 1, and further comprising a bypass valve, wherein the bypass valve comprising:
    a bypass valve housing having a substantially cylindrical cavity formed therein, wherein the cylindrical cavity having a first bypass port, a second bypass port, a third bypass portion and a fourth bypass port, wherein the second bypass port is in communication with the liquid inlet port, and wherein the third bypass port is in communication with the liquid outlet port; and
    a rotor mounted in the bypass valve cylindrical cavity for selectively directing liquid from the first bypass port and the third bypass port to the second bypass port and the fourth by pass port, respectively, or from the first bypass port to the fourth bypass port.

13. A method of operating a control valve assembly for a water treatment system, wherein the control valve assembly having a housing and a rotor, wherein the housing having a substantially cylindrical cavity formed therein with a liquid inlet port, a liquid outlet port, a regenerant refill port, a drain port, a first tank port and a second tank port; wherein the rotor having a central axis, wherein the rotor is rotatable about the central axis when the rotor is mounted in the cavity, the method comprising:
    forming in the rotor a first primary flow path, a second primary flow path, a first secondary flow path, and a second secondary flow path;
    rotating the rotor with respect to the housing so that the rotor is in a service position, wherein the first primary flow path direct liquid from the liquid inlet port to the first tank port and wherein the second primary flow path directs liquid from the second tank port to the liquid outlet port;
    rotating the rotor with respect to the housing so that the rotor is in a refill position, wherein the first primary flow path directs liquid from the liquid inlet port to the first tank port and the liquid outlet port and wherein the first secondary flow path directs liquid from the second tank port to the regenerant refill port;
    rotating the rotor with respect to the housing so that the rotor is in a regeneration and slow rinse position, wherein the first primary flow path directs liquid from the liquid inlet port to the liquid outlet port and the second primary flow path, wherein the first secondary flow path directs liquid from the regenerant refill port to the second tank port, and wherein the second secondary flow path directs liquid from the first tank port to the drain port;
    rotating the rotor with respect to the housing so that the rotor is in a backwash position, wherein the first primary flow path directs liquid from the liquid inlet port to the liquid outlet port and the second primary flow path, wherein the second primary flow path directs liquid to the second tank port, and wherein the second secondary flow path directs liquid from the first tank port to the drain port; and
    rotating the rotor with respect to the housing so that the rotor is in a fast rinse position, wherein the first primary flow path directs liquid from the liquid inlet port to the liquid outlet port and the first tank port, and wherein the first secondary port directs liquid from the second tank port to the drain port.

* * * * *